United States Patent Office 3,262,905
Patented July 26, 1966

3,262,905
HEAT STABILIZATION OF POLYVINYL ALCOHOL WITH ALKALI METAL PHOSPHATES
Joseph G. Martins, Ludlow, Mass., assignor, by mesne assignments, to Monsanto Company, a corporation of Delaware
No Drawing. Filed Feb. 26, 1962, Ser. No. 175,830
4 Claims. (Cl. 260—45.7)

This invention relates to the preparation of heat stable polyvinyl alcohol. More particularly, it relates to the heat stabilization of polyvinyl alcohol by the incorporation of alkali metal phosphates in the resin.

Polyvinyl alcohol, it is well known, is usually prepared by the alkaline hydrolysis of a suitable polyvinyl ester rather than by the direct polymerization of the vinyl alcohol monomer, a compound too unstable for independent existence. Alkaline hydrolysis, although more efficient in many ways than acid hydrolysis, is unfortunately attended by the formation of color, a phenomenon which renders the resulting resin more or less inacceptable for many potential applications. Several methods have been proposed to restore this useful resin to its contemplated applications and these methods have been, by and large, successful. However, a problem remains. If a colorless polyvinyl alcohol be subjected to moderate heat for a certain period, say for instance 150° C. for 30 minutes, it will without further treatment develop a significant amount of color. This color may range from deep yellow to dark brown. It arises in an unknown manner in the course of the decomposition of the resin, a process which probably involves oxidation, chain splitting, crosslinking, dehydration and so on. While the appearance of color is in itself a phenomenon to be avoided, it is also accompanied as may well be imagined by other serious changes in the resin's properties such as, to name a few, decrease in flexibility, loss of ability to elongate, embrittlement and alteration of solubility characteristics.

It is therefore an object of this invention to prepare a polyvinyl alcohol with great inherent resistance to color producing thermal degradation.

This has been achieved by the treatment of ordinary colorless polyvinyl alcohol resin with a small percentage of alkali metal phosphate. The improvement derived from this treatment may be demonstrated by heating the resins, treated and untreated, at an elevated temperature, e.g. 150° C. for 45 minutes, and observing the formation of color in the untreated sample. The contrast between both samples will be vivid.

Intimate blending of the salt with the resin is imperative if maximum thermal stability is to be obtained. Irregular distribution of the salt in the resin will permit degradation to occur in salt poor locations with the result that even though 90% of the resin withstands heat, the appearance and the weaknesses of the untreated locations will negative, for all practical purposes, the benefits of the operation. How the blending must be done is illustrated in the following examples.

*Example 1*

In this preparation, there was used a water soluble partially hydrolyzed polyvinyl acetate characterized by a 20% weight content of unhydrolyzed acetate groups calculated as polyvinyl acetate and a viscosity of 5 centipoises for a 4% solution in water at 20° C. This polyvinyl alcohol was still wet with the hydrolysis solvent to the extent that it contained 45% by weight methyl alcohol and methyl acetate.

To 130 g. of this wet comminuted polyvinyl alcohol resin was added 3 g. finely powdered mixture of 1 part mono-sodium phosphate and 1 part disodium phosphate in 300 ml. methanol. The mixture was slurried and stirred at 50° C. for 10 minutes. After filtration, the resin was dried at 70° C. for 2 hours and was then subjected to a temperature of 150° C. in a circulating air oven for 45 minutes.

Only slightly yellowing resulting from this drastic heat treatment of the sodium phosphate containing resin. In contrast, the same polyvinyl alcohol resin dried and heated in this manner but not containing sodium phosphate turned into a dark brown-yellow residue. In addition, the treated resin remained water soluble as opposed to the untreated material.

*Example 2*

An Abbe ball mill pulverized mixture of 50 g. polyvinyl alcohol with 0.12 g. disodium phosphate and 0.10 g. monosodium phosphate also proved to have excellent thermal stability as opposed to an untreated sample of the same resin tested according to the method of Example 1. These materials were ground to pass through a 200-mesh sieve. The particular polyvinyl alcohol used here contained 1% residual ester groups and had a viscosity of 32 centipoises as a 4% solution in water at 20° C.

*Example 3*

A dry partially hydrolyzed copolymer of vinyl acetate and vinyl stearate (monomer ratio: 97:3) having a residual ester group content of 15% and a viscosity of 6 centipoises at 20° C. as a 4% solution in a water-methanol mixture with a volume ratio of 80:20, previously neutralized with acetic acid and comminuted, was treated with 0.3 g. (0.3% of the resin weight) of a 1:1 mixture of mono- and dipotassium phosphates in 300 ml. methanol in the manner of Example 1.

Exposure to a temperature of 150° C. for 45 minutes in a circulating air oven only resulted in the formation of a slight amount of yellow color. The same resin in the absence of the potassium phosphates turned dark amber.

The polymers which can benefit from this invention belong to the general class of partially to completely hydrolyzed polyvinyl ester homopolymers as well as partially to completely hydrolyzed polyvinyl ester copolymers made up of either different vinyl ester monomers or of a vinyl ester monomer and another compatible vinyl monomer which is not a vinyl ester. This will be illustrated presently. These polyvinyl alcohols or hydrolyzed polyvinyl esters should have at least 20% of their ester groups hydrolyzed off and possesses a molecular weight average within the range of 1,200 to 125,000.

For example, useful polyvinyl alcohols are those obtained by the hydrolysis 20–100% of the ester groups of homopolymers such as vinyl acetate, vinyl propionate, vinyl butyrate, vinyl hexoate, vinyl benzoate and others. As typical of the useful terpolymer type of vinyl alcohol which is obtained by the partial hydrolysis of vinyl ester copolymers there are included copolymers of a vinyl ester with other vinyl esters such as vinyl acetate, vinyl propionate, vinyl butyrate, vinyl hexoate, vinyl stearate, and the like; copolymers of a vinyl ester with a vinyl halide such as vinyl chloride and vinyl bromide; copolymers of a vinyl ester with the lower alkyl esters of acrylic acid such as methyl acrylate, ethyl acrylate, propyl acrylate, butyl acrylate, hexyl acrylate, ethylhexyl acrylate, octyl acrylate and the like; copolymers of a vinyl ester with the lower alkyl esters of methacrylic acid such as methyl, propyl, butyl, hexyl, octyl methacrylates and the like; copolymers of a vinyl ester with monoethylenically unsaturated carboxylic acids such as acrylic, methacrylic, crotonic acids and the like; copolymers of a vinyl ester with other ethylenic monomers such as ethylene, propylene, isobutylene and others. All these useful vinyl alcohol polymers are well known and methods for their preparation are readily available.

The process of this invention is especially applicable to water soluble polyvinyl alcohols formed by the direct hydrolysis of the vinyl ester polymers and copolymers just enumerated. These preferred water soluble polyvinyl alcohols may contain from 0 to 45% unhydrolyzed ester groups and may have a viscosity ranging from 3 to 65 centipoises as 4% solutions in water at 20° C. It should be noted, however, that the water solubility of such polymers is in addition to the two factors just mentioned, i.e. degree of hydrolysis and molecular size as indicated by viscosity, affected by the nature of the remaining ester groups. If such groups be benzoates or stearates, for instance, much less than 45% of them must remain in the polyvinyl alcohol molecule if the latter is to be water soluble. An especially preferred class of polyvinyl alcohols is afforded by the completely or partially hydrolyzed polymers of vinyl acetate by reason of the commercial availability of such materials. Methods to prepare such polymers are found in U.S. Patents 2,502,715 and 2,643,994.

The phosphate salts which will impart heat stability to these polyvinyl alcohols are those of alkali metals which have a slightly acid to slightly alkaline reaction in water, i.e. show a pH value set between 6 and 8. Any number of combinations of mono-, di- and tribasic salts may be used to obtain a pH within the range. Potassium and lithium phosphates are examples of usable salts, but sodium phosphates are preferred.

From as little as 0.2% of the salts based on the weight of polyvinyl alcohol resin to as much as 1.5% may give satisfactory protection. The exact amount selected will ultimately depend on the nature of the particular resin—percent hydrolysis, etc., its previous history—was it neutralized after hydrolysis and with what? and the temperature that it has to withstand in the contemplated application. For instance, where a water soluble resin is destined for blow extrusion into water soluble film, 0.2–0.5% of phosphate salts will generally assure the stability of the resin during the blow extrusion process at the temperature usually employed.

In the cases where the blending of the salt and the resin is to be carried out in an organic liquid rather than in a ball mill, such a liquid must be a non-solvent of the resin particles and should have a boiling point not exceeding about 100° C. Examples of useful liquids are afforded by methanol, methyl acetate, acetone, ethanol, ethyl acetate, methyl ethyl ketone, ethylene glycol dimethyl ether, tetrahydrofuran, tertiary butyl alcohol, ethyl propionate, diethyl ketone, diisopropyl ether, n-propyl acetate, chloroform, benzene, n-hexane, carbon tetrachloride, ethylene dichloride, and the like. Mixtures of such of these solvents as are miscible may also be employed.

The processing of polyvinyl alcohol by the method disclosed in this invention does not preclude the addition of the variety of useful ingredients which are known to improve the properties of this polymer. Among the types of materials which may be added to the resin along with the alkali metal phosphates are plasticizers, anti-oxidants, fungicides, and so on, depending on the prospective use of the resin. The phosphate treated resin containing the appropriate additives can be employed in conventional manner i.e. can undergo such transformation as molding, extrusion and so on. Advantageously, however, is the fact that a greater working temperature range is now permissible for the use of the resin either during its transformation or in its ultimate applications.

What is claimed is:

1. Solid polyvinyl alcohol containing in intimate dispersion 0.2 to 1.5% by weight of a stabilizer consisting of a finely divided alkali metal phosphate of slightly acid to slightly alkaline reaction,
   said polyvinyl alcohol being water soluble and having from 0–45% residual acetate groups calculated as polyvinyl acetate and having a viscosity of 3–65 centipoises as a 4% aqueous solution at 20° C.

2. Polyvinyl alcohol as in claim 1 wherein the alkali metal phosphate content is 0.2 to 0.5% by weight of the polyvinyl alcohol.

3. Polyvinyl alcohol as in claim 1 wherein the phosphate is sodium phosphate.

4. Polyvinyl alcohol as in claim 3 wherein the sodium phosphate is a mixture of approximately equal parts of monosodium phosphate and disodium phosphate.

References Cited by the Examiner
UNITED STATES PATENTS

| | | | |
|---|---|---|---|
| 2,493,390 | 1/1950 | Chaban | 260—45.7 |
| 2,502,715 | 4/1950 | Germain | 260—91.3 |
| 2,510,777 | 6/1950 | Gray | 260—7 |
| 2,581,360 | 1/1952 | Costa et al. | 260—45.7 |
| 2,643,994 | 6/1953 | Germain | 260—91.3 |

LEON J. BERCOVITZ, *Primary Examiner.*

DONALD E. CZAJA, *Examiner.*

H. E. TAYLOR, *Assistant Examiner.*